United States Patent [19]

Kitamura et al.

[11] Patent Number: 5,156,254

[45] Date of Patent: Oct. 20, 1992

[54] MANUAL PALLET CHANGER

[75] Inventors: Koichiro Kitamura; Shigeru Yamada, both of Takaoka, Japan

[73] Assignee: Kitamura Machinery Co., Ltd., Japan

[21] Appl. No.: 827,532

[22] Filed: Jan. 24, 1992

Related U.S. Application Data

[63] Continuation of Ser. No. 592,680, filed as PCT/JP80/00922, Jul. 18, 1990, abandoned.

[30] Foreign Application Priority Data

Jul. 24, 1989 [JP] Japan .................................. 1-188780

[51] Int. Cl.⁵ ............................................. B65G 47/00
[52] U.S. Cl. .................................. 198/346.1; 29/33 P
[58] Field of Search ............... 414/222, 225, 267, 286; 198/346.1; 29/33 P

[56] References Cited

U.S. PATENT DOCUMENTS

| | | | |
|---|---|---|---|
| 4,133,423 | 1/1979 | Zankl | 198/346.1 |
| 4,172,512 | 10/1979 | Clegg et al. | 198/346.1 |
| 4,373,840 | 2/1983 | Miller, Jr. | 198/346.1 X |
| 4,679,286 | 7/1987 | Momoi et al. | 198/346.1 X |
| 4,797,991 | 1/1989 | Yamaguchi et al. | 198/346.1 X |
| 4,976,025 | 12/1990 | Aldridge, Jr. et al. | 198/346.1 X |
| 5,044,486 | 9/1991 | Kitamura | 198/346.1 |

Primary Examiner—David A. Bucci
Attorney, Agent, or Firm—Pravel, Gambrell, Hewitt, Kimball & Krieger

[57] ABSTRACT

A manual pallet changer for performing a loading operation and an unloading operation for a pallet between a table of a machine tool and a pallet magazine comprising a clamp for clamping the pallet to the table of the machine tool. The pallet magazine connected to the machine tool by an opening and closing joint, the pallet magazine as a whole being rotatable about a supporting point of the opening and closing joint; and the pallet magazine having first guide rails arranged alone a longitudinal direction of the pallet magazine in two rows; second guide rails arranged along a direction different from the longitudinal direction in two rows; movable guide rails arranged along the longitudinal direction in two rows, the movable guide rails being movable between an upper position and a lower position; and a lift for moving up and down the movable guide rails.

14 Claims, 6 Drawing Sheets

MANUAL PALLET CHANGER

This is a continuation of co-pending application Ser. No. 592,680 filed as PCT/JP80/00922, Jul. 18, 1990, now abandoned.

TECHNICAL FIELD

This invention relates to a manual pallet changer for loading a pallet or pallets to a table of a machine tool and also for unloading the pallet from the table.

TECHNICAL BACKGROUND

In conventional pallet changers, automatic pallet changing operation was performed with a hydraulic cylinder or a motor.

Such conventional pallet changers each having the hydraulic cylinder or the motor were heavy in weight and large in size, and also the cost of manufacturing the conventional pallet changers had a tendency to increase. In addition, such conventional pallet changers caused problems in a pallet positioning operation, a start timing operation and so on. Furthermore, it was troublesome to perform the maintenance of the conventional pallet changers when the conventional pallet changers were in trouble.

DISCLOSURE OF THE INVENTION

The object of the invention is to provide a compact and light weight-manual pallet changer which can be manually operated with ease and save much trouble in a pallet changing operation.

Figure 1:
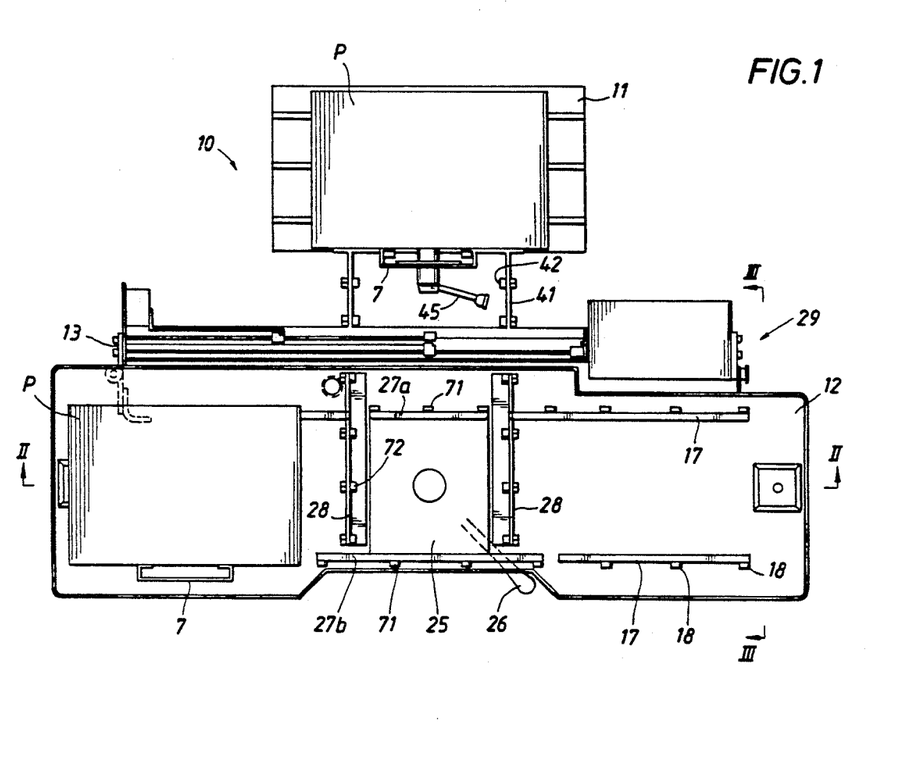
FIG. 1 shows a top view showing the embodiment of the pallet changer according to this invention.
Figure 5:
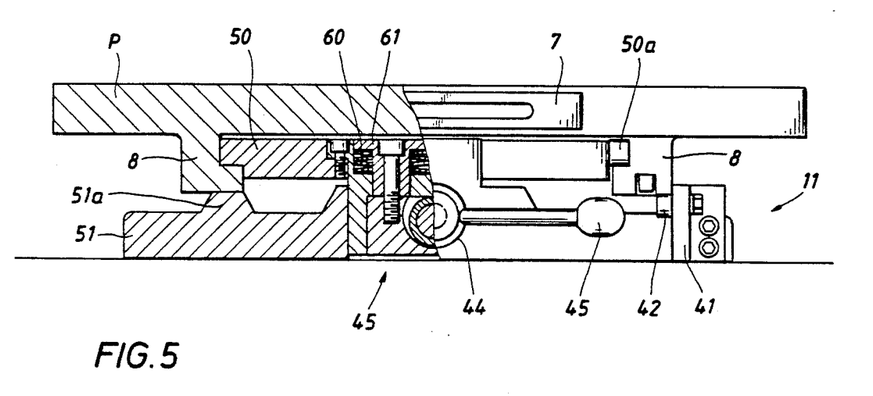
FIG. 5 is a side view showing the table with a cross-sectional portion.
Figure 10:
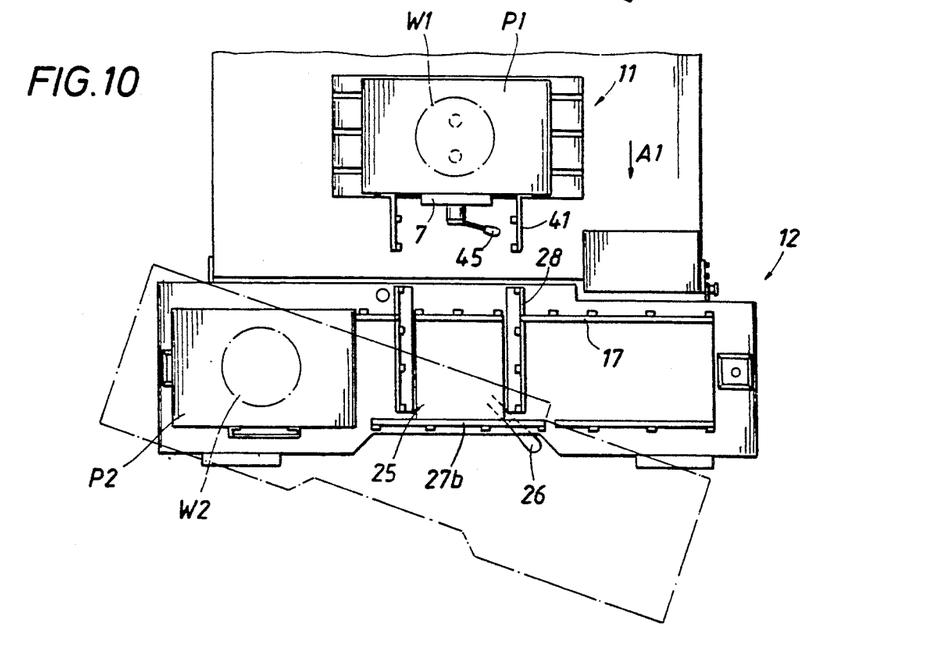
FIGS. 10 to 13 show manual pallet changing operation for the pallet changer.

The manual pallet changer according to this invention, as shown in FIG. 5, is equipped with a clamp means 43 (see FIG. 6) so as to clamp a pallet to a table 11 in a machine tool. In the manual pallet changer, a pallet magazine 12 of FIG. 1 is connected with respect to the machine tool by an opening and closing joint 13, and thus the pallet magazine 12 as a whole is designed to swing about a supporting point of the opening and closing joint 13 as shown in FIG. 10. The above-mentioned pallet magazine 12 is characterized as follows.

Figure 2:
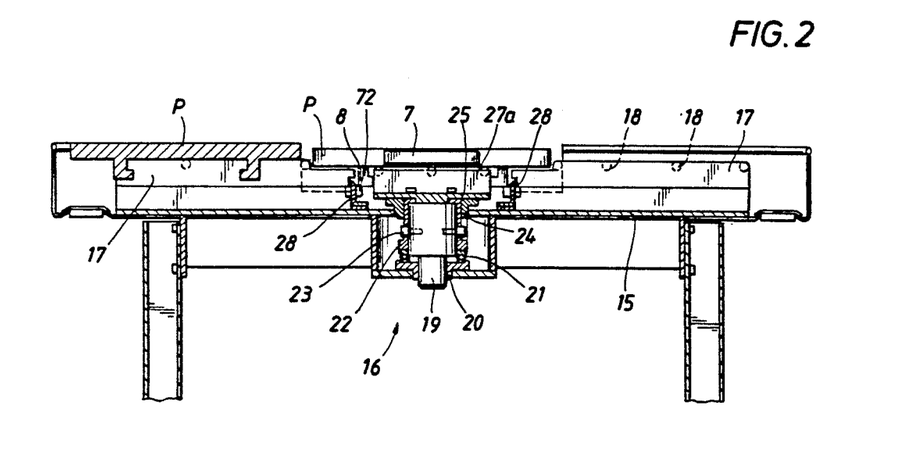
FIG. 2 is a cross-sectional view taken along the II—II line of the pallet magazine of FIG. 1.

The pallet magazine 12 comprises: guide rails 17 arranged along a longitudinal direction of the pallet magazine 12 in two rows; guide rails 28 arranged along a direction different from the longitudinal direction in two rows; movable guide rails 27a, 27b arranged along the longitudinal direction in two rows and being moved between an upper position and a lower position; and a lifting means 16 as shown in FIG. 2 for moving up and down the movable guide rails 27a, 27b.

In addition, the pallet can be supported and moved along the longitudinal direction, by both the guide rails 17 and the movable guide rails 27a, 27b directed along the longitudinal direction when the movable guide rails 27a, 27b are positioned in the upper position. Additionally, the pallet can be supported and moved along the direction different from the longitudinal direction, by the guide rails 28 directed along the direction different from the longitudinal direction when the movable guide rails 27a, 27b are positioned in the lower position. In this case, the pallet is loaded to the table 11 of the machine tool or the pallet is unloaded from the table 11.

The above-mentioned loading and unloading operations are to be combined to perform the pallet changing operation between the table 11 and the pallet magazine 12.

Furthermore, as the pallet magazine as a whole is rotated or swings about the supporting point of the opening and closing joint 13, an operator can work near the table 11 (namely, the operator can work in the position between the pallet magazine and the machine tool).

SUMMARY OF INVENTION

The present invention generally relates to a manual pallet changer. A table of a machine tool is equipped with a clamp means for clamping a pallet to the table. A pallet magazine is connected by an opening and closing joint to the machine tool. The pallet magazine as a whole can swing or rotate about the supporting point of the joint. The pallet magazine comprises a first set of guide rails arranged along a longitudinal direction of the pallet magazine in two rows. A second set of guide rails is arranged along a direction different from the longitudinal direction in two rows. Movable guide rails are arranged in two rows along the longitudinal direction, the movable guide rails being movable between an upper position and a lower position, and a lift means for vertically moving the guide rails.

BEST MODE FOR CARRING OUT THE INVENTION

The embodiment according to this invention will be explained hereinafter, referring to Figures.

FIG. 1 is a top view showing a manual pallet changer (is called as "pallet changer" hereinafter ) 10 of the embodiment according to this invention. The pallet changer 10 comprises a table 11 of a machine tool and a pallet magazine 12. Incidentally, the machine tool body is not partly shown in Figures for a simplification purpose, but the table 11 is shown.

Figure 4:
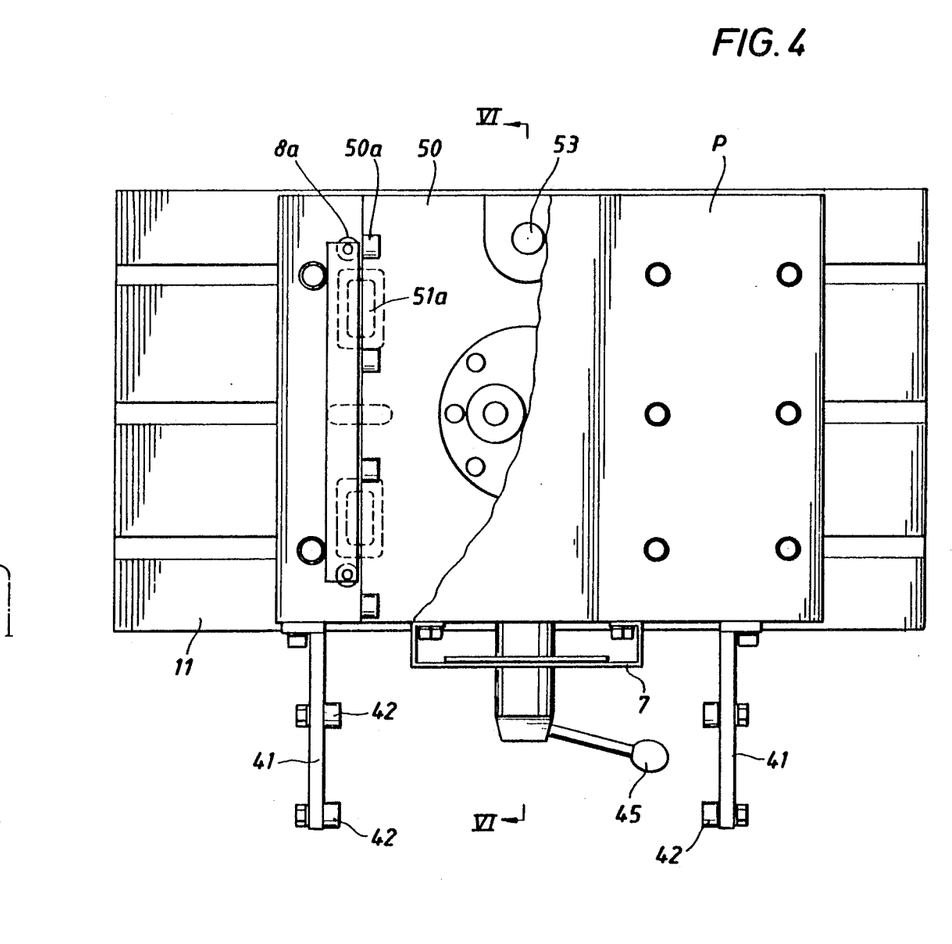
FIG. 4 is a top view showing the table of FIG. 1.

A pallet P will be explained hereinafter referring to FIGS. 5,6 and 7. The pallet P is a conventional pallet. The pallet P has two legs 8 formed in a rail-shape on the underside of the pallet P. The cross-section of each leg 8 is formed in a hook-shape. A handle 7 is fixed to the front side of the pallet P. A collar 6 is fixed to the center of the front portion of the underside of the pallet and a collar 6 is fixed to the center of the rear portion of the underside thereof in order to form concave portions 9. As shown in FIG. 4, each leg 8 of the pallet may be equipped with rollers 8a.

The pallet magazine 12 is connected by the hinge or the opening and closing joint 13 with respect to the front portion or side portion of the machine tool. The pallet magazine as a whole can be rotated (or swing) about the supporting point of the opening and closing joint 13. The dashed line in FIG. 10 indicates a swing motion of the pallet magazine.

Figure 3:
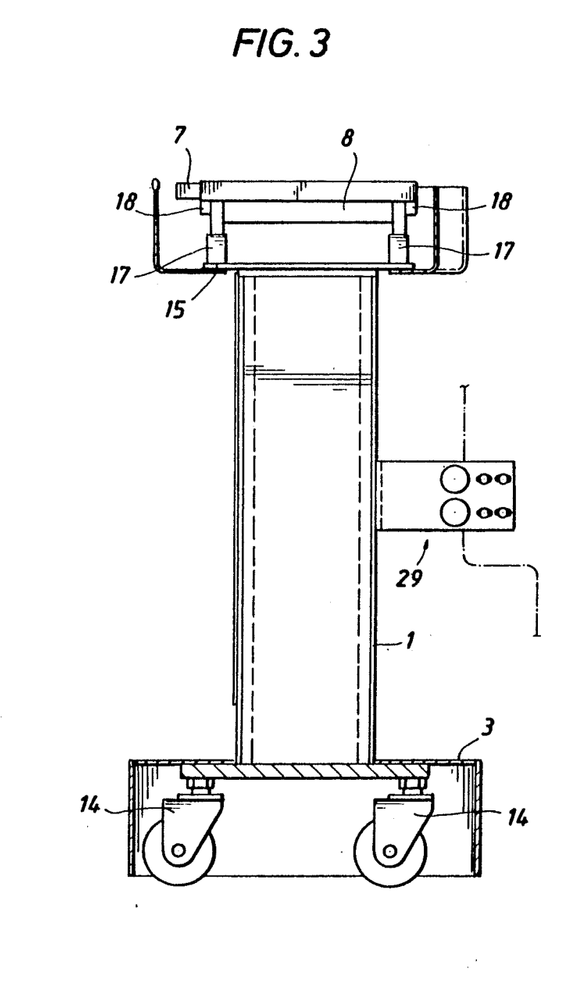
FIG. 3 is a cross-sectional view taken along the III—III line of the pallet magazine of FIG. 1.

FIGS. 2 is a cross-sectional view taken along the II—II line of FIG. 1 and FIG. 3 is a cross-sectional view taken along the III—III line of FIG. 1. The pallet magazine is formed in a box-shape as a whole and equipped with casters 14 on a leg portion 3 thereof. A lift means 16 is arranged in the center portion of a frame 15. Guide rails 17 are arranged in vicinity to the lift means 16 along the longitudinal direction of the pallet magazine and fixed on the frame 15. The guide rails 17 are arranged in two rows and each guide rail 17 is equipped with rollers 18.

The lift means 16 will be explained hereinafter. As shown in FIG. 2, a concave portion 15a is provided in the center portion of the frame 15. A shaft 19 is arranged in the concave portion 15a in such a manner that the shaft 19 can be vertically moved along a short stroke. A thrust bearing 20 is arranged between the lower portion of the shaft 19 and the concave portion 15a. A thrust bearing 21 is arranged on the thrust bearing 20. A cylindrical cam 22 is arranged on the thrust bearing 21. The cylindrial cam 22 has a groove. Cam followers 23 are placed in the groove. The cam followers 23 are fixed with respect to the shaft.

The groove of the cylindrical cam is formed in such a manner that the shaft 19 can be vertically moved by means of the cam followers 23 when rotating the cylindrical cam 22.

A handle 26 is fixed to the cylindrical cam 22 so as to cause the rotating motion of the cylindrical cam 22. A guide sleeve 24 is arranged between the upper portion of the cylindrical cam and the frame.

A whole rectangular plate 25 is fixed on the guide sleeve 24. Guide rail 27a, 27b are fixed on the upper face of the plate 25 along the longitudinal direction in two rows. The guide rails 27a, 27b are aligned with the guide rails 17 directed along the longitudinal direction, respectively, and thus the guide rails 27a, 27b, 17 constitute the whole long guide rails on the upper portion of the magazine, in two rows. The guide rails 27a, 27b has rollers 71.

The height of the guide rails 27a, 27b arranged on the plate 25 is to be designed as follows. That is, the height of the guide rails 27a, 27b is to be set in such a way that the guide rails 27a, 27b can be aligned with the guide rails 17 directed along the longitudinal direction at the same height when the guide rails 27a, 27b are positioned in the upper position by moving upwardly the plate 25 together with the shaft 19. The rollers 18 of the guide rails 17 and the rollers 71 of the guide rails 27a, 27b are to be positioned on substantially the same level. Accordingly, the guide rails 27a, 27b are positioned below the guide rails 17 when the plate 25 is moved downwardly together with the shaft 19.

Two guide rails 28 are fixed on the upper face of the frame 15 between the guide rails 17 and the guide rails 27a, 27b and arranged along a different direction (namely the transverse direction perpendicular to the longitudinal direction). The guide rails 28 are positioned along the direction perpendicular to the guide rails 17, 27a, 27b. Each guide rail 28 has rollers 72.

The height of the guide rails 28 is to be set as follows. The pallet P is supported by the rollers 72 of the guide rails 28 and does not contact with the rollers 71 of the guide rails 27a, 27b when the guide rails on the plate 25 are positioned in the lower position. On the contrary, the pallet P is supported by the roller 71 of the guide rails 27a, 27b and does not contact with the rollers 72 of the guide rails 28 when the guide rails 27a, 27b on the plate 25 are positioned in the upper position.

A connecting means 29 is provided with respect to the pallet magazine and the machine tool 2 in such a way that the connecting means 29 is positioned in the opposite position with respect to the opening and closing joint 13. The connecting means 29 is constructed that two plates are connected by a connector.

Figure 8:
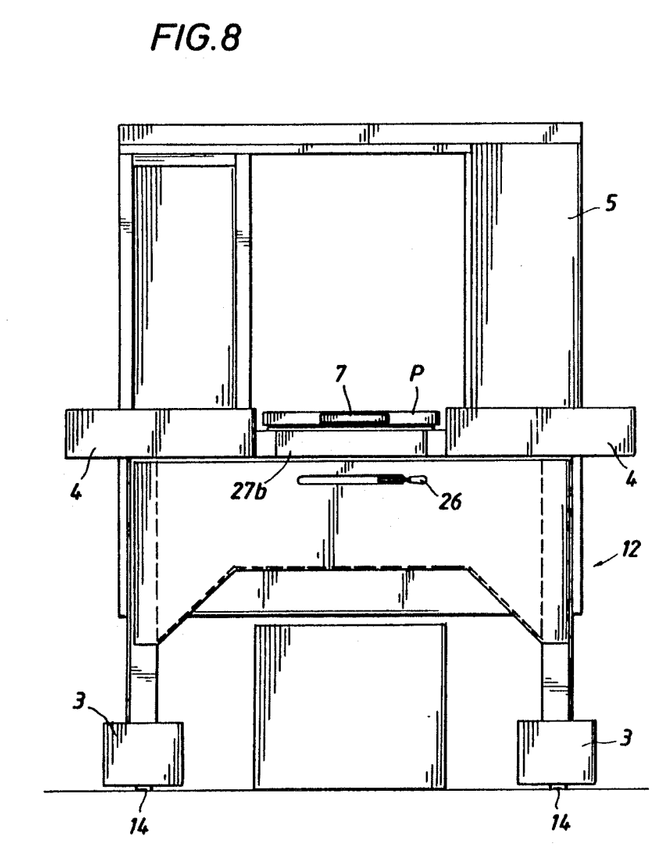
FIG. 8 is a schematic front view showing the embodiment of the pallet changer and the machine tool body equipped with a chip cover.
Figure 9:
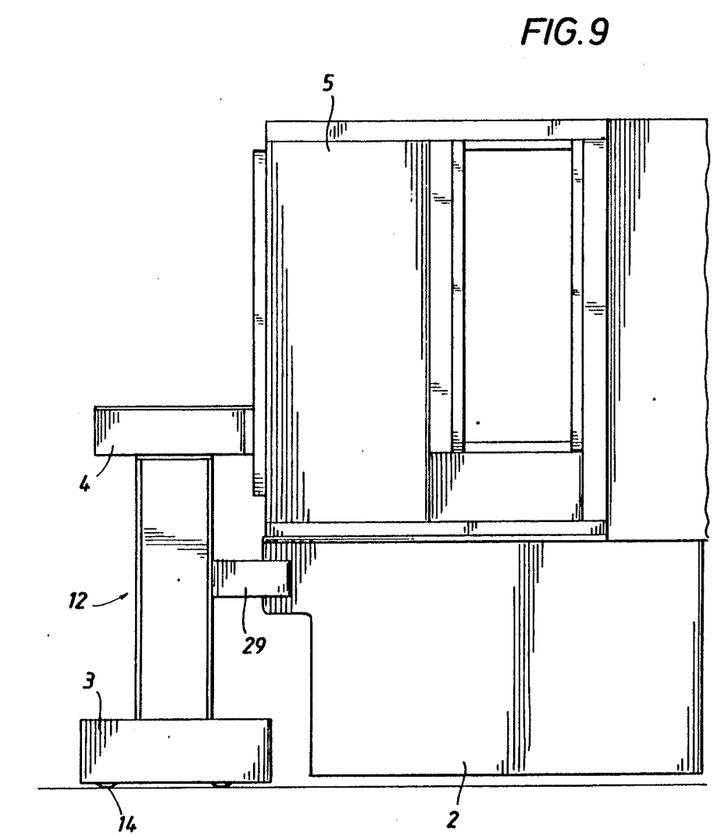
FIG. 9 is a side view showing the pallet changer of FIG. 8.

Next, the table 11 of the machine tool 2 will be explained. A chip guard 5 is generally arranged around the table 11. FIGS. 8 and 9 schematically show the chip guard 5 FIG. 8 is a schematic front view showing the chip guard and FIG. 9 is a schematic side view showing the chip guard. Incidentally, in FIG. 8 and 9, the portions except for the chip guard 5 are simply shown. FIG. 4 is a plan view showing the table 11 on which the pallet is set, with portions broken away for the sake of clarity. FIG. 5 is a front view showing the table 11, with portions broken away. FIG. 6 is a cross-sectional view taken along the VI—VI line of FIG. 4.

Two brackets 41 each having rollers 42 are arranged in front of the table 11. The brackets 41 are aligned with the guide rails 28 along the direction perpendicular to the longitudinal direction of the pallet magazine. The table 11 is provided with a clamp means 43.

The clamp means 43 will be mentioned. A shaft 44 is provided in the center of the table 11 and directed in a horizontal direction. A grip lever 45 is fixed to the shaft 44 for its rotation purpose. An eccentric shaft 46 is fixed to one end portion of the shaft 44. The reference letter d of FIG. 6 indicates an eccentric distance or an off-center arrangement distance.

The eccentric shaft 46 is rotatably mounted within a clamp base 51. A needle bearing 48 is arranged around the center portion of the eccentric shaft 46. A housing 47 is arranged around the outer side of the needle bearing 48. A clamp plate 50 is fixed to the upper portion of the housing 47. The clamp plate 50 is provided with rollers 50a on the upper portions of its both sides. A width of the clamp plate 50 is adapted for the space between the two legs 8 of the pallet P. A belleville spring 60 and a cover 61 are arranged on the upper side of the housing 47.

Each of both ends of the eccentric shaft 46 has a spring pin 49, a block 52 and a pin 53. The block 52 is downwardly pressed by a spring 54.

Figure 6:
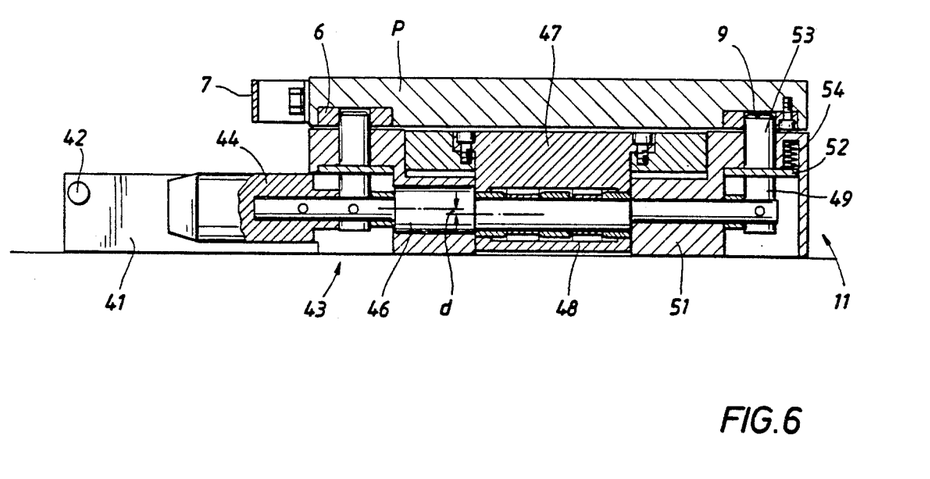
FIG. 6 is a cross-sectional view taken along the VI—VI line of FIG. 4.
Figure 7:
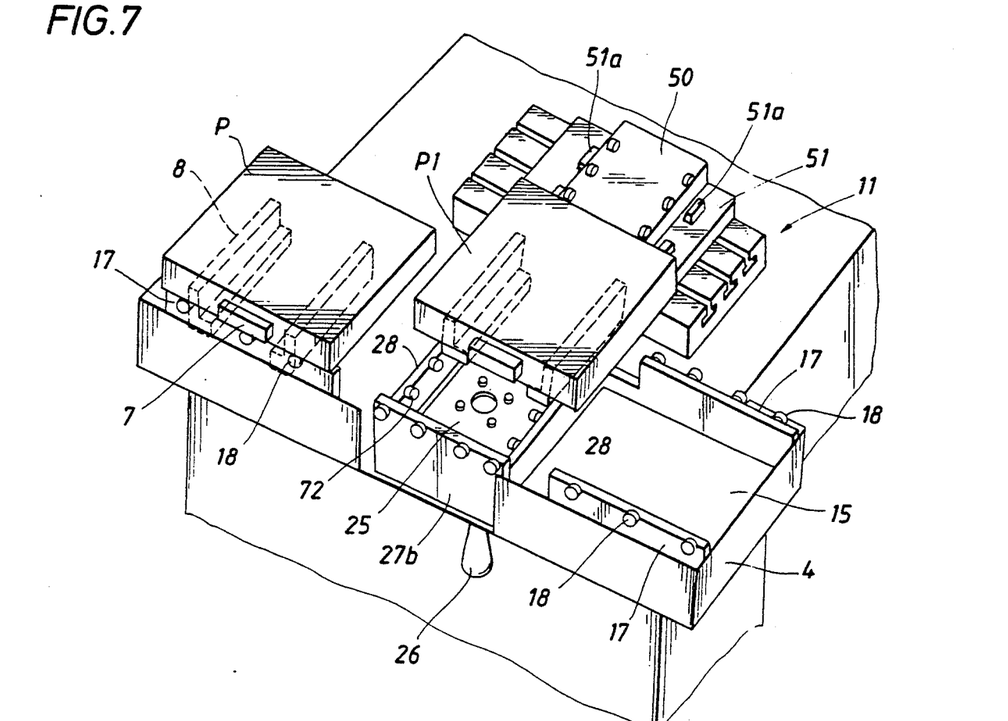
FIG. 7 is a schematic perspective view showing the embodiment of the pallet changer according to this invention.

As shown in FIGS. 4 and 6, the end portion of the pin 53 is inserted into the concave portion 9 of the pallet P when clamping the pallet P on the clamp base.

If the eccentric shaft 46 is rotated by manually operating the grip lever 45, the clamp plate 50 is vertically moved. The clamp base 51 has four convex portions 51a so that the legs 8 of the pallet P are designed to be clamped on the convex portions 51a.

Figure 11:
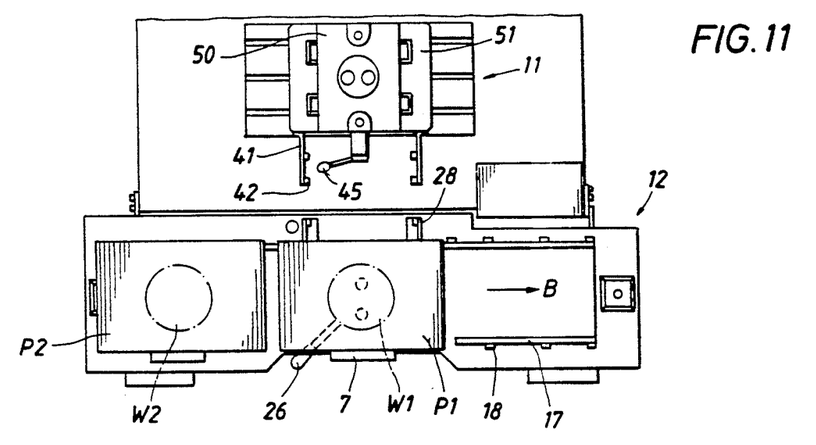
Figure 12:
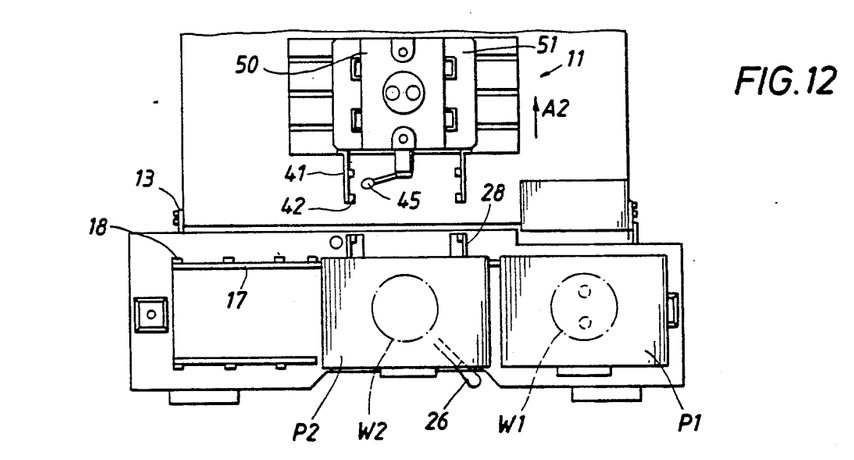

Next, the operation for the pallet changer 10 will be explained, referring to FIGS. 10-12.

In FIG. 10, the machined workpiece W1 is mounted on the pallet P1 which is clamped on the table. The pallet P1 is unclamped by manually operating the grip lever 45 by an operator. The operator pulls the handle 7 to move the pallet P1 in the direction of the arrow A1 when the rails 27a, 27b of the lift means 16 is positioned in the lower position.

The pallet P1 is manually moved along the rail brackets 41 to the rails 28. Thus the pallet P is positioned in the center of the magazine 12 as shown in FIG. 12. After that, the rails 27a, 27b of the lift means 16 are moved up by manually operating the lever 26.

The pallet P1 is moved along the direction of the arrow B.

Figure 13:
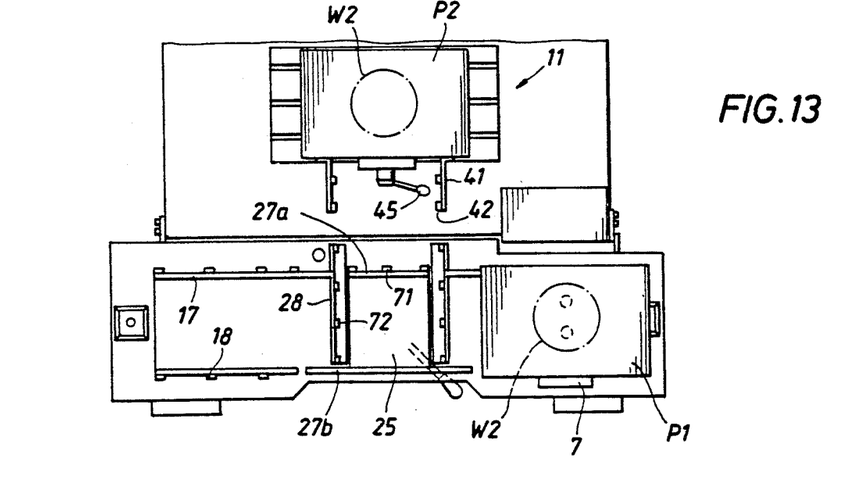

A raw workpiece W2 is mounted on a pallet P2. The pallet P2 is moved along the direction of the arrow B to the center position of the magazine 12. The rails 27a, 27b are downwardly moved by manually operating the lever 26.

The pallet P2 is moved along the direction of the arrow A2 to the table. After that, the pallet P2 is clamped on the table by manually operating the grip lever 45.

It is possible to exchange the pallet P1 for the pallet P2 according to the above-mentioned routine.

Additionally, the front side of the machine tool is easy of access for the operator by swinging the pallet magazine as shown by the dashed line in FIG. 10.

Incidentally, the pallet changer according to this invention is not limited to the above-mentioned embodiment. For example, the pallet changer according to this invention may include three or more pallets. Also, the clamp means and the lift means may be electro-operated.

The pallet changer according to this invention is small in size and light in weight and can save much trouble in a pallet changing operation. Thus it is easy to manually operate the pallet changer. Also, it is advantageous that the table in the machine is easy of access for the operator in operation.

INDUSTRIAL FIELD

According to this invention, the manual pallet changer is used for loading a pallet or pallets to a table in a machine tool and unloading the pallet or the pallets from the table.

What is claimed is:

1. A manual pallet changer for performing a loading operation and an unloading operation for a pallet between a table of a machine tool and a pallet magazine comprising:

a clamp means (43) for clamping the pallet to the table (11) of the machine tool;

the pallet magazine (12) connected to the machine tool by an opening and closing joint (13), the pallet magazine (12) as a whole being rotatable about a supporting point of the opening and closing joint (13); and the pallet magazine (12) having:

first guide rails (17) arranged along a longitudinal direction of the pallet magazine (12) in two rows;

second guide rails (28) arranged along a direction different from the longitudinal direction in two rows;

movable guide rails (27a, 27b) arranged along the longitudinal direction in two rows, the movable guide rails (27a, 27b) being movable between an upper position and a lower position; and a lift means (16) for moving up and down the movable guide rails;

wherein the pallet can be supported and moved along the longitudinal direction by both the first guide rails (17) and the movable guide rails (27a, 27b) directed along the longitudinal direction when the movable guide rails (27a, 27b) are positioned in the upper position, wherein the pallet can be supported and moved along the direction different from the longitudinal direction by the second guide rails (28) along the direction different from the longitudinal direction when the movable guide rails are positioned in the lower position, wherein the pallet is loaded from the pallet magazine (12) to the table (11) of the machine tool by moving the pallet along the direction different from the longitudinal direction and then the pallet is clamped by the clamp means (43) to the table (11), and wherein the pallet is unloaded from the table (11) to the pallet magazine (12) by moving the pallet along the direction different from the longitudinal direction after the clamp means (43) is in unclamping condition.

2. A manual pallet changer for a machine tool comprising:

a table (11) for supporting a pallet (P) in the machine tool;

a pallet magazine (12) arranged relative to the machine tool for supporting the pallet (P);

the pallet magazine (12) including first guide means (17) arranged along a first direction (B) in the pallet magazine (12), second guide means (28) arranged along a second direction (A) perpendicular to the first direction (B), and third guide means (27a, 27b) arranged along the first direction (B) and movable along a vertical direction between an upper position and a lower position;

the third guide means (27a, 27b) set in the upper position to manually feed the pallet (P) along the first guide means (17) and the third guide means (27a, 27b) in the first direction (B) in the pallet magazine (12) or the third guide means (27a, 27b) being set in the lower position to manually feed the pallet (P) between the pallet magazine (12) and the table (11) along the second guide means (28) in the second direction (A); and the pallet magazine (12) including supporting means (14) for supporting the pallet magazine (12) and providing relative motion between the table (11) and the pallet magazine (12) by moving the pallet magazine (12).

3. A manual pallet changer for a machine tool of claim 2, further comprising fourth guide means (41) mounted relative to the table (11) and aligned with the second guide means (28) to manually feed the pallet (P) between the pallet magazine (12) and the table (11) along the second guide means (28) and the fourth guide means (41).

4. A manual pallet changer for a machine tool of claim 2, further comprising first connecting means (13) for connecting the pallet magazine (12) relative to the machine tool in such a manner that the pallet magazine (12) can be moved to or from the machine tool about the axis of the first connecting means (13).

5. A manual pallet changer for a machine tool of claim 4, further comprising second connecting means (29) for detachably connecting the pallet magazine (12) to the machine tool.

6. A manual pallet changer for a machine tool of claim 2, wherein the supporting means (14) is a caster.

7. A manual pallet changer for a machine tool of claim 2, wherein the pallet (P) has a handle or grip (7) for performing manual feed operation of the pallet (P) along the first direction (B) and the second direction (A).

8. A manual pallet changer for a machine tool of claim 2, further comprising lift means (16) provided to the pallet magazine (12) to manually set the third guide means (27a, 27b) in the upper position or the lower position.

9. A manual pallet changer for a machine tool of claim 8, wherein the lift means (16) including a cylindrical cam (22) having a guide groove, a shaft member (19) arranged within the cylindrical cam (22) for supporting the third guide means (27a, 27b), and a cam follower (23) attached to the shaft member (19) and guided along the guide groove, the shaft member (19) being moved along the vertical direction so as to set the third guide means (27a, 27b) in the upper position or in the lower position by rotation of the cylindrical cam (22) about the vertical direction.

10. A manual pallet changer for a machine tool of claim 2, further comprising a clamp means (43) for clamping the pallet (P) onto the table (11).

11. A manual pallet changer for a machine tool of claim 10, wherein the clamp means (43) includes a lever (45), an eccentric shaft (46) connected to the lever (45), and a clamp plate (50) for clamping the pallet (P) onto the table (11) by rotation of the eccentric shaft (46) when manually operating the lever (45).

12. A manual pallet changer for a machine tool of claim 11, wherein the lever (45) of the clamp means (43) is arranged in space between the table (11) and the pallet magazine (12).

13. A manual pallet changer for a machine tool of claim 3, wherein the first guide means (17), the second guide means (28), the third guide means (27a, 27b), and the fourth guide means (41) have rollers (18, 72, 71, 42) for supporting and manually feeding the pallet (P) along the first direction (B) or the second direction (A).

14. A manual pallet changer for a machine tool comprising:
 a table (11) for supporting a pallet (P) in the machine tool;
 a pallet magazine (12) arranged relative to the machine tool for supporting the pallet (P);
 the pallet magazine (12) including first guide means (17) arranged along a first direction (B) in the pallet magazine (12), second guide means (28) arranged along a second direction (A) perpendicular to the first direction (B), and third guide means (27a, 27b) arranged along the first direction (B) and movable along a vertical direction between an upper position and a lower position;
 the third guide means (27a, 27b) set in the upper position to manually feed the pallet (P) along the first guide means (17) and the third guide means (27a, 27b) in the first direction (B) in the pallet magazine (12) or the third guide means (27a, 27b) being set in the lower position to manually feed the pallet (P) between the pallet magazine (12) and the table (11) along the second guide means (28) in the second direction (A);
 the pallet magazine (12) including supporting means (14) for supporting the pallet magazine (12) and providing relative motion between the table (11) and the pallet magazine (12); and
 a chip guard (5) surrounding the table (11).

* * * * *